United States Patent
Alkhalawi et al.

(10) Patent No.: US 12,503,638 B2
(45) Date of Patent: Dec. 23, 2025

(54) GAS LIFT USING DISSOLVABLE $CO_2$ SALT PELLETS AND SYSTEMS AND METHODS RELATED THERETO

(71) Applicant: SAUDI ARABIAN OIL COMPANY, Dhahran (SA)

(72) Inventors: Abdullah Abdulaziz Alkhalawi, Dhahran (SA); Abdulaziz Salah Alkhatib, Dhahran (SA); Meshal Mansour Alshalan, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 46 days.

(21) Appl. No.: 18/181,442

(22) Filed: Mar. 9, 2023

(65) Prior Publication Data

US 2024/0301276 A1    Sep. 12, 2024

(51) Int. Cl.
*E21B 43/34*     (2006.01)
*C09K 8/594*     (2006.01)
*C09K 8/92*      (2006.01)

(52) U.S. Cl.
CPC .............. *C09K 8/594* (2013.01); *C09K 8/92* (2013.01)

(58) Field of Classification Search
CPC ............ C09K 8/594; C09K 8/92; E21B 43/34
USPC ....................................................... 166/305.1
See application file for complete search history.

(56) References Cited

U.S. PATENT DOCUMENTS

| | | | |
|---|---|---|---|
| 9,155,310 B2* | 10/2015 | Agrawal | A61Q 17/005 |
| 9,657,552 B2* | 5/2017 | Choudhary | C09K 8/74 |
| 11,499,090 B2* | 11/2022 | Schipper | C06B 49/00 |
| 2003/0047307 A1* | 3/2003 | Jenkins | E21B 33/134 166/187 |
| 2019/0010795 A1* | 1/2019 | Lo Cascio | E21B 43/2605 |

FOREIGN PATENT DOCUMENTS

| | | |
|---|---|---|
| CA | 2629204 C | 7/2011 |
| CA | 2918439 A1 | 7/2016 |

OTHER PUBLICATIONS

Parvani, R. and Shukla, M.C. (1991), "Water soluble clear coating compositions and their film properties", Pigment & Resin Technology, vol. 20 No. 9, pp. 4-7.

* cited by examiner

*Primary Examiner* — William D Hutton, Jr.
*Assistant Examiner* — Ashish K Varma
(74) *Attorney, Agent, or Firm* — Vorys, Sater, Seymour and Pease LLP

(57) ABSTRACT

Systems and methods including introducing a plurality of dissolvable $CO_2$ salt pellets into a wellbore in fluid communication with a drilling fluid present within the wellbore; dissolving the dissolvable $CO_2$ salt pellets, thereby releasing $CO_2$ gas; and causing air lift in the drilling fluid as the $CO_2$ gas is released.

16 Claims, 1 Drawing Sheet

GAS LIFT USING DISSOLVABLE CO₂ SALT PELLETS AND SYSTEMS AND METHODS RELATED THERETO

FIELD OF THE DISCLOSURE

The present disclosure relates generally to the production of hydrocarbons in the oil and gas industry and, more particularly, to the use of dissolvable carbon dioxide ($CO_2$) salt pellets to provide lift as a technique to begin or resume hydrocarbon production.

BACKGROUND OF THE DISCLOSURE

Subterranean well drilling operations, such as those to recover hydrocarbons, typically involve the circulation of a high-density drilling fluid (or "mud") through an interior length of drill pipe or "drill string." A drill bit is arranged at the distal end of the drill pipe and a mud pump operates to pump the drilling fluid into the drill pipe where it circulates to the drill bit and is discharged from the drill bit via a plurality of orifices. Among other things, the drilling fluid is vital in maintaining control of a wellbore. Hydrostatic pressure is exerted by the drilling fluid to offset increases in formation pressure that would otherwise cause formation fluids to enter the wellbore, which could cause loss of well control, damage to drilling equipment, or injury to drilling operators.

However, after drilling operations are complete, the drilling fluid may not be immediately flowed back to the surface for clean-up (e.g., due to local regulations) and thus the formation pressure cannot overcome the hydrostatic pressure exerted by the drilling fluid within the wellbore. Accordingly, artificial gas lift is required to "kickoff" hydrocarbon production. In a conventional kickoff operation, artificial nitrogen lift is utilized, in which high-pressure nitrogen gas is injected into the wellbore using coiled tubing run deep into the wellbore to reduce the hydrostatic pressure and density of the drilling fluid present within the wellbore, which reduces the bottomhole pressure, and thus allows reservoir fluids to enter the wellbore. Conventional artificial nitrogen lift operations are commonly associated with high operational costs, and substantial time requirements to run the required coiled tubing.

With respect to the aforementioned considerations, the present disclosure provides compositions, systems, and methods for improved artificial gas lift, particularly for use in kickoff operations for hydrocarbon production of subterranean wells.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure provides a method including introducing a plurality of dissolvable $CO_2$ salt pellets into a wellbore in fluid communication with a drilling fluid present within the wellbore; dissolving the dissolvable $CO_2$ salt pellets, thereby releasing $CO_2$ gas; and causing air lift in the drilling fluid as the $CO_2$ gas is released.

According to an embodiment consistent with the present disclosure provides a system including a wellbore extending from a surface location and through one or more hydrocarbon bearing subterranean formations, the wellbore containing a drilling fluid; and dissolvable $CO_2$ salt pellets arranged within the wellbore and in fluid communication with the drilling fluid, releasing CO2 gas upon contact with the drilling fluid, wherein the dissolvable $CO_2$ salt pellets dissolve upon contact with the drilling fluid and release $CO_2$ gas and thereby cause air lift in the drilling fluid.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1A:
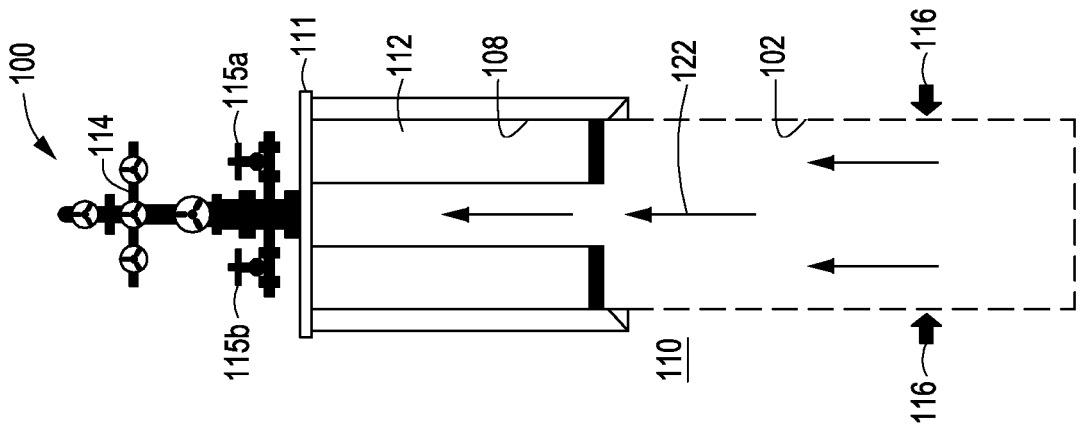
FIGS. 1A-1C illustrates an example well system that may embody or otherwise employ one or more principles of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to the production of hydrocarbons in the oil and gas industry and, more particularly, to the use of dissolvable $CO_2$ salt pellets to provide lift as a technique to begin or resume hydrocarbon production. It is to be noted that while the present disclosure discusses the dissolvable $CO_2$ salt pellets with respect to kickoff operations, they may be utilized in any other artificial gas lift operations, such as to revive a "dead" well to prolong hydrocarbon production, without limitation.

The embodiments herein provide dissolvable $CO_2$ salt pellets that are introduced into a wellbore to induce hydrocarbon production as part of a kickoff operation. As used herein, the term "kickoff operation," refers to the displacement of fluids (e.g., drilling fluids) within a wellbore to reduce hydrostatic pressure and induce natural production of reservoir fluids, particularly hydrocarbon fluids, to the surface.

The dissolvable $CO_2$ salt pellets of the present disclosure are designed to react with water molecules present within the wellbore (e.g., water within the drilling fluid or other formation water) to produce $CO_2$. The produced $CO_2$ rises to the surface to reduce the hydrostatic pressure and density of drilling fluid present within the wellbore, which reduces the bottomhole pressure, and thus allows reservoir fluids (e.g., hydrocarbons) to enter the wellbore and flow to the surface. The dissolvable $CO_2$ salt pellets provide an alternative to artificial nitrogen lift kickoff operations. Comparatively, the dissolvable $CO_2$ salt pellets of the present disclosure for providing artificial gas lift for use in a kickoff operation may reduce costs (e.g., coiled tubing and associated equipment is not required), reduce operational time, reduce the number of operators to perform the operation, and provide an environmentally friendly alternative (e.g., less equipment needed, reduced operation footprint). Moreover, use of the dissolvable $CO_2$ salt pellets of the present disclosure in a kickoff operation does not require any wellbore intervention to reduce hydrostatic pressure, but merely the use of a bullheading, as described below.

The dissolvable $CO_2$ salt pellets of the present disclosure operate based on the reaction between the acetic acid in powder form and the sodium bicarbonate salt in powder form upon contact with an aqueous media, which results in a lower density product of $CO_2$, as well as water and sodium acetate ($CH_3COONa$). The reaction proceeds according to the following reaction formula:

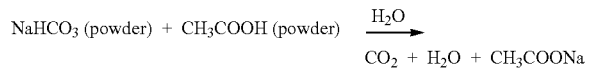

$$NaHCO_3 \text{ (powder)} + CH_3COOH \text{ (powder)} \xrightarrow{H_2O} CO_2 + H_2O + CH_3COONa$$

The produced $CO_2$ lowers the density of a drilling fluid (or other high-density fluid) within a wellbore, and reduces hydrostatic pressure within the wellbore, causing artificial gas lift to kickoff a wellbore and induce natural hydrocarbon production to the surface. Moreover, the resultant sodium acetate is soluble in an aqueous media, such as within the water produced by the reaction itself and/or by water within the wellbore. Accordingly, in one or more embodiments of the present disclosure, the dissolvable $CO_2$ salt pellets of the present disclosure are 100% dissolvable within a wellbore comprising a drilling fluid.

The dissolvable $CO_2$ salt pellets are formed from acetic acid ($CH_3COOH$) in powder form and the sodium bicarbonate salt ($NaHCO_3$) in powder form, which are formed into solid pellets using, for example, a hydraulic pressing machine applying a high force thereto. Other suitable pressing or forming machinery may also be used, without departing from the scope of the present disclosure. The resultant dissolvable $CO_2$ salt pellets are thus solid, but may also be somewhat brittle. When the pressed dissolvable $CO_2$ salt pellets enter into the wellbore, the reaction described below may begin at once (i.e., upon contact with an aqueous media within the wellbore). However, the pressed dissolvable $CO_2$ salt pellets are sufficiently strong to be introduced into a drilling fluid within a wellbore at a rate and pressure sufficient to allow the dissolvable $CO_2$ salt pellets, or a portion thereof, to traverse deep into the wellbore to facilitate a kickoff operation. The pressed dissolvable $CO_2$ salt pellets may traverse deep into the wellbore, such as to a depth of equal to or greater than about 5,000 feet true vertical depth (TVD) subsea level, such as in the range of about 5,000 feet to about 6,000 feet, encompassing any value and subset therebetween.

In addition to hydraulic pressing, the dissolvable $CO_2$ salt pellets are coated to ensure that the $CO_2$ gas produced as a result of the reaction of the acetic acid sodium bicarbonate can be delivered to a deep location within the wellbore before providing lift to the drilling fluid. The coating is designed to melt under the temperature conditions within a wellbore comprising a drilling fluid over time, providing essentially a time release of $CO_2$. The time in which the coating melts may depend on a number of factors including, but not limited to, the temperature of the wellbore at the location which the any one or a plurality of dissolvable $CO_2$ salt pellets is located. Upon melting of the coating, the powder acetic acid and powder sodium bicarbonate salt contact the aqueous environment and the reaction provided above to produce $CO_2$ within the wellbore to provide artificial lift for a kickoff operation. Moreover, the coating may strengthen the dissolvable $CO_2$ salt pellets to better withstand the rate and pressure of hydraulic pressure to introduce the dissolvable $CO_2$ salt pellets into the drilling fluid in the wellbore.

In one or more embodiments, the coating material may comprise an epoxy compound that dissolves or melts under wellbore temperatures, such as about 50° C. to about 300° C. Epoxies may include, but are not limited to, phenolic glycidyl ethers, aromatic glycidyl amines, cycloaliphatics, and the like, and any combination thereof. The epoxy compound may also be a water-based epoxy.

In general, the shape of the dissolvable $CO_2$ salt pellets, whether or not coated, may be substantially spherical (e.g., spherical, spheroid, ovoid, and the like), cubic, polygonal, or otherwise irregular shaped. In general, the dissolvable $CO_2$ salt pellets, whether or not coated, are substantially spherical.

In various embodiments described herein, the size of the dissolvable $CO_2$ salt pellets, whether or not coated, may be selected to facilitate their entry through valving and into product tubing within a wellbore. The size may further be designed to facilitate movement through the drilling fluid within the wellbore to a deep location. The average diameter of the dissolvable $CO_2$ salt pellets, whether or not coated, may vary based on a number of factors, such as the particular valve types or sizes used. In one or more nonlimiting aspects, the average diameter of the dissolvable $CO_2$ salt pellets may be, for example, 25.4 millimeters (mm) to about 50.8 mm, encompassing any value and subset therebetween, such as about 25.4 mm to about 38.1 mm, or about 38.1 mm to about 50.8 mm.

In one or more embodiments of the present disclosure, the amount of $CO_2$ required to provide artificial lift for a kickoff operation may be about 4000 gallons (gal) to about 8000 gal, encompassing any value and subset therebetween, such as about 4000 gal to about 7000 gal, or about 4000 gal to about 6000 gal, or about 4000 gal to about 5000 gal, or about 8000 gal to about 7000 gal, or about 8000 gal to about 7000 gal, or about 8000 gal to about 6000 gal, or about 8000 gal to about 5000 gal. The particular amount of $CO_2$ may be dependent on a number of factors including, but not limited to, the size of the wellbore, the density of the drilling fluid, the configuration of the wellbore (e.g., vertical, horizontal, otherwise deviated), and the like, and any combination thereof. In order to satisfy the amount of $CO_2$ required for a particular kickoff operation, the combination of acetic acid and sodium bicarbonate salt (i.e., the amount of dissolvable $CO_2$ salt pellets) may be provided during a kickoff operation in an amount of about 200 pounds (lbs) to about 400 lbs, encompassing any value and subset therebetween, such as about 200 lbs to about 350 lbs, or about 200 lbs to about 300 lbs, or about 200 lbs to about 250 lbs, or about 400 lbs to about 350 lbs, or about 400 lbs to about 300 lbs, or about 400 lbs to about 250 lbs. The molar ratio of the sodium bicarbonate to acetic acid may be about 1:1. Such amounts are feasible for use at a wellsite and application for use in kickoff operations.

Figure 1B:
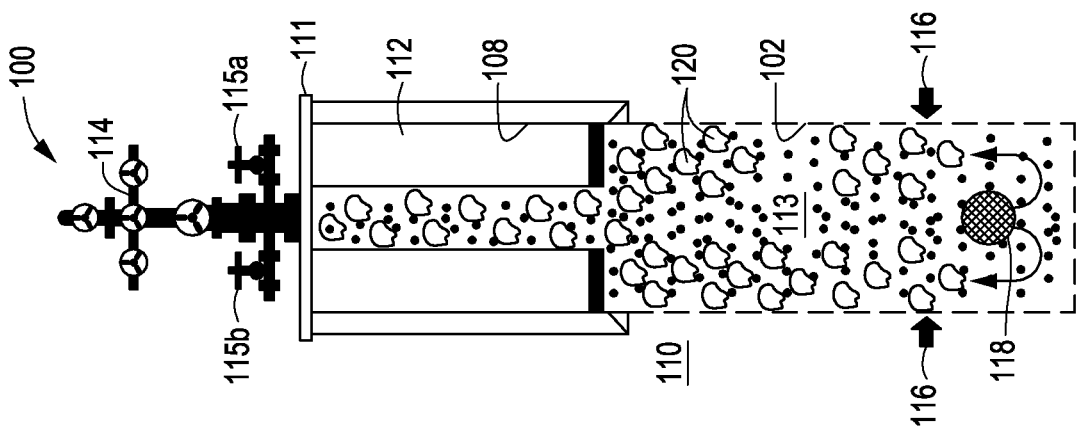
Figure 1C:
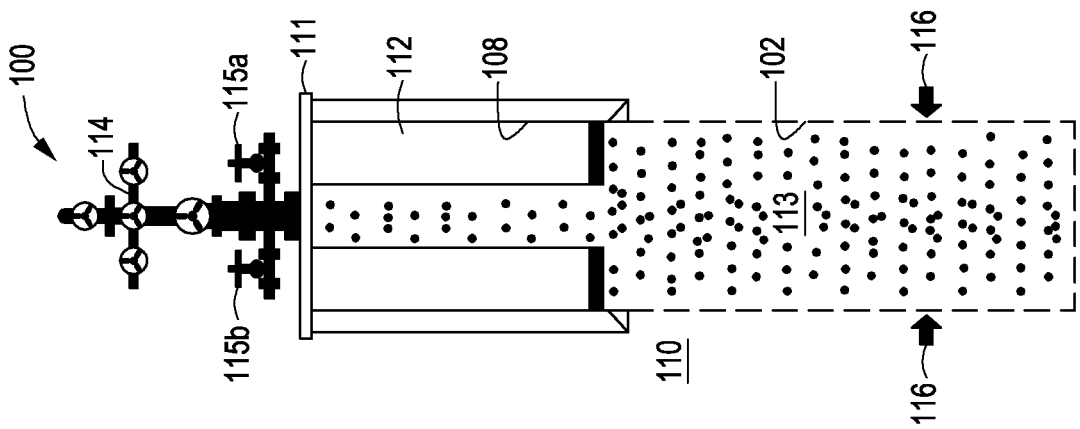

Referring now to FIGS. 1A-1C, illustrated is a well system 100 that may employ the principles of the present disclosure, according to one or more embodiments. Specifically, the well system 100 of FIGS. 1A-1C illustrates a method of performing a kickoff operation in accordance with the present disclosure. Like labeling will be used throughout FIGS. 1A-1C. Further, it is to be noted that the well system 100 illustrates a wellbore that has been previously drilled.

With continued reference to FIGS. 1A-1C, the well system 100 comprises a wellbore 102 extending through various subterranean formation strata 110. As shown, the wellbore 102 is substantially vertical, but may otherwise transition into a substantially horizontal section or deviated section, without departing from the scope of the present disclosure. Upper portions of the wellbore 102 may comprise a string of casing 108 (alternately referred to as "liner") cemented therein. In some applications, a portion of the wellbore 102 may comprise an open hole section. In other embodiments, however, the casing 108 may extend the length of the wellbore 102.

A string of pipe 112 may be positioned within the wellbore 102 and arranged concentric with the casing 108. The string of pipe 112 may comprise a string of multiple pipes coupled end-to-end and extended into the wellbore 102. In some embodiments, the string of pipe 112 may comprise a second string of casing anchored to and extending from the first string of casing 108 at an uphole location from a wellhead 111. In one or more embodiments, a hydrocarbon extraction system in the form of a Christmas tree 114 may be arranged at the wellhead 111. Other hydrocarbon extraction systems may additionally be arranged at the wellhead 111, such as a production rig, a production platform, or the like. The Christmas tree 114 comprises a set of valves, a first valve 115a for inputting the dissolvable $CO_2$ salt pellets and a second valve 115b for discharge of downhole fluids.

Referring now to FIG. 1A, the wellbore 102 is filled with drilling fluid 113. The drilling fluid 113 exerts hydrostatic pressure 116 on the wellbore 102. As shown in FIG. 1C, dissolvable $CO_2$ salt pellets 118 (one shown) are added through first valve 115a via bullheading (i.e., injection into the wellbore 102 at a pressure higher than pore pressure of the formation 110). As the dissolvable $CO_2$ salt pellets 118 dissolve, $CO_2$ gas 120 is released, the drilling fluid 113 exits through the second valve 115b, and the hydrostatic pressure 116 is reduced. Upon removal of the drilling fluid 113, as shown in FIG. 1C, hydrocarbon production 122 proceeds unimpeded by drilling fluid 113 (FIGS. 1A and 1B).

Embodiments disclosed herein include:

Embodiment A: A method comprising: introducing a plurality of dissolvable $CO_2$ salt pellets into a wellbore in fluid communication with a drilling fluid present within the wellbore; dissolving the dissolvable $CO_2$ salt pellets, thereby releasing $CO_2$ gas; and causing air lift in the drilling fluid as the $CO_2$ gas is released.

Embodiment B: A well system, comprising: a wellbore extending from a surface location and through one or more hydrocarbon bearing subterranean formations, the wellbore containing a drilling fluid; and dissolvable $CO_2$ salt pellets arranged within the wellbore and in fluid communication with the drilling fluid, releasing CO2 gas upon contact with the drilling fluid, wherein the dissolvable $CO_2$ salt pellets dissolve upon contact with the drilling fluid and release $CO_2$ gas and thereby cause air lift in the drilling fluid.

Each of embodiments A and B may have one, more, or all of the following additional elements in any combination:

Element 1: wherein the dissolvable $CO_2$ salt pellets comprise acetic acid in powder form and sodium bicarbonate salt in powder form.

Element 2: wherein the dissolvable $CO_2$ salt pellets comprise acetic acid in powder form and sodium bicarbonate salt in powder form, and wherein the acetic acid in powder form and the sodium bicarbonate salt in powder form are hydraulically pressed to form the dissolvable $CO_2$ salt pellets.

Element 3: wherein the dissolvable $CO_2$ salt pellets comprise acetic acid in powder form and sodium bicarbonate salt in powder form, and wherein the acetic acid in powder form and the sodium bicarbonate salt in powder form are coated with a coating material to form the dissolvable $CO_2$ salt pellets.

Element 4: wherein the dissolvable $CO_2$ salt pellets comprise acetic acid in powder form and sodium bicarbonate salt in powder form, and wherein the acetic acid in powder form and the sodium bicarbonate salt in powder form are coated with a coating material to form the dissolvable $CO_2$ salt pellets, and wherein the coating material is an epoxy compound.

Element 5: wherein the dissolvable $CO_2$ salt pellets comprise acetic acid in powder form and sodium bicarbonate salt in powder form, and wherein the acetic acid in powder form and the sodium bicarbonate salt in powder form are coated with a coating material to form the dissolvable $CO_2$ salt pellets, and wherein the coating material is an epoxy compound, and wherein the epoxy compound is selected from the group consisting of a phenolic glycidyl ether, an aromatic glycidyl amine, a cycloaliphatic, and any combination thereof.

Element 6: wherein the amount of dissolvable $CO_2$ salt pellets is in the range of 200 pounds to 400 pounds.

Element 7: wherein the dissolvable $CO_2$ salt pellets have an average diameter in the range of about 25.4 millimeters to about 50.8 millimeters.

Element 8: wherein the amount of the plurality of dissolvable $CO_2$ salt pellets is capable of providing the $CO_2$ gas in an amount in the range of 4000 gallons to 8000 gallons.

Thus, the composition, use, and system of the present disclosure comprising the dissolvable $CO_2$ salt pellets improve production operations by facilitating the removal of drilling fluid within a wellbore. The dissolvable $CO_2$ salt pellets of the present disclosure can minimize lost time and operational costs by maximizing drilling fluid removal prior to hydrocarbon production.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and are not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A method comprising:
    introducing a plurality of dissolvable $CO_2$ salt pellets into a wellbore containing a drilling fluid, wherein the dissolvable $CO_2$ salt pellets comprise acetic acid and sodium bicarbonate salt in powder form; and
    contacting the dissolvable $CO_2$ salt pellets with water in the wellbore or in the drilling fluid, thereby:
        causing a reaction between the dissolvable $CO_2$ salt pellets and the water;
        releasing $CO_2$ gas from the dissolvable $CO_2$ salt pellets as the dissolvable $CO_2$ salt pellets dissolve in the water; and
        causing lift in the drilling fluid as the $CO_2$ gas is released, wherein the lift reduces hydrostatic pressure and density of the drilling fluid.

2. The method of claim 1, wherein the acetic acid in powder form and the sodium bicarbonate salt in powder form are hydraulically pressed to form the dissolvable $CO_2$ salt pellets.

3. The method of claim 1, wherein the dissolvable $CO_2$ salt pellets are coated with a coating material.

4. The method of claim 3, wherein the coating material is an epoxy compound.

5. The method of claim 4, wherein the epoxy compound is selected from the group consisting of a phenolic glycidyl ether, an aromatic glycidyl amine, a cycloaliphatic, and any combination thereof.

6. The method of claim 1, wherein an amount of dissolvable $CO_2$ salt pellets is in a range of 200 pounds to 400 pounds.

7. The method of claim 1, wherein the dissolvable $CO_2$ salt pellets have an average diameter in a range of about 25.4 millimeters to about 50.8 millimeters.

8. The method of claim 1, wherein an amount of dissolvable $CO_2$ salt pellets is capable of providing the $CO_2$ gas in an amount in a range of 4000 gallons to 8000 gallons.

9. A well system, comprising:
    a wellbore extending from a surface location and through one or more hydrocarbon bearing subterranean formations, the wellbore containing a drilling fluid; and
    dissolvable $CO_2$ salt pellets arranged within the wellbore and in fluid communication with the drilling fluid, wherein the dissolvable $CO_2$ salt pellets comprise acetic acid and sodium bicarbonate salt in powder form;
    wherein the dissolvable $CO_2$ salt pellets are contacted with water in the wellbore or in the drilling fluid, thereby:
        causing a reaction between the dissolvable $CO_2$ salt pellets and the water;
        releasing $CO_2$ gas from the dissolvable $CO_2$ salt pellets as the dissolvable $CO_2$ salt pellets dissolve in the water; and
        causing lift in the drilling fluid as the $CO_2$ gas is released, wherein the lift reduces hydrostatic pressure and density of the drilling fluid.

10. The system of claim 9, wherein the acetic acid in powder form and the sodium bicarbonate salt in powder form are hydraulically pressed to form the dissolvable $CO_2$ salt pellets.

11. The system of claim 9, wherein the dissolvable $CO_2$ salt pellets are coated with a coating material.

12. The system of claim 11, wherein the coating material is an epoxy compound.

13. The system of claim 12, wherein the epoxy compound is selected from the group consisting of a phenolic glycidyl ether, an aromatic glycidyl amine, a cycloaliphatic, and any combination thereof.

14. The system of claim 9, wherein an amount of dissolvable $CO_2$ salt pellets is in a range of 200 pounds to 400 pounds.

15. The system of claim 9, wherein the dissolvable $CO_2$ salt pellets have an average diameter in a range of about 25.4 millimeters to about 50.8 millimeters.

16. The system of claim 9, wherein an amount of dissolvable $CO_2$ salt pellets is capable of providing the $CO_2$ gas in an amount in a range of 4000 gallons to 8000 gallons.

* * * * *